US008918624B2

(12) United States Patent
Allen et al.

(10) Patent No.: US 8,918,624 B2
(45) Date of Patent: Dec. 23, 2014

(54) SCALING AND MANAGING WORK REQUESTS ON A MASSIVELY PARALLEL MACHINE

(75) Inventors: Paul V. Allen, Rochester, MN (US); Thomas A. Budnik, Rochester, MN (US); Mark G. Megerian, Rochester, MN (US); Samuel J. Miller, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1354 days.

(21) Appl. No.: 12/121,262

(22) Filed: May 15, 2008

(65) Prior Publication Data

US 2009/0288085 A1 Nov. 19, 2009

(51) Int. Cl.
G06F 9/30 (2006.01)
G06F 9/48 (2006.01)
G06F 9/38 (2006.01)

(52) U.S. Cl.
CPC ............ G06F 9/4881 (2013.01); G06F 9/3887 (2013.01)
USPC ............................................ 712/216; 712/20

(58) Field of Classification Search
None
See application file for complete search history.

(56) References Cited

U.S. PATENT DOCUMENTS

| | | | |
|---|---|---|---|
| 5,878,241 A * | 3/1999 | Wilkinson et al. | ............ 712/203 |
| 5,961,642 A | 10/1999 | Lewis | |
| 6,366,945 B1 | 4/2002 | Fong et al. | |
| 6,453,426 B1 | 9/2002 | Gamache et al. | |
| 6,671,699 B1 | 12/2003 | Black et al. | |
| 6,711,691 B1 | 3/2004 | Howard et al. | |
| 6,854,009 B1 | 2/2005 | Hughes | |
| 7,010,617 B2 | 3/2006 | Kampe et al. | |
| 7,475,274 B2 | 1/2009 | Davidson | |
| 7,506,335 B1 | 3/2009 | Wooff et al. | |
| 7,523,231 B1 | 4/2009 | Gupta et al. | |
| 7,664,836 B2 | 2/2010 | Kim | |
| 7,694,305 B2 | 4/2010 | Karlsson et al. | |
| 7,702,965 B1 | 4/2010 | Planki et al. | |
| 7,818,010 B2 | 10/2010 | Matteo et al. | |
| 2001/0042123 A1 | 11/2001 | Moody et al. | |
| 2002/0069235 A1 | 6/2002 | Chen | |
| 2003/0084088 A1 | 5/2003 | Shaffer | |
| 2003/0091038 A1* | 5/2003 | Hagedorn | ..................... 370/359 |
| 2003/0140132 A1 | 7/2003 | Champagne et al. | |
| 2003/0177296 A1* | 9/2003 | Kurth | ............................ 710/244 |
| 2004/0210648 A1 | 10/2004 | Woodruff | |
| 2005/0141554 A1 | 6/2005 | Hammarlund et al. | |
| 2005/0155033 A1 | 7/2005 | Luoffo et al. | |
| 2005/0198641 A1 | 9/2005 | Eilam et al. | |
| 2005/0278523 A1 | 12/2005 | Fortin et al. | |
| 2005/0289362 A1 | 12/2005 | Merkin et al. | |
| 2006/0190505 A1 | 8/2006 | DeMaio et al. | |
| 2006/0270413 A1 | 11/2006 | Matteo et al. | |
| 2007/0112864 A1 | 5/2007 | Ben-Natan | |
| 2008/0040541 A1 | 2/2008 | Brockmann | |

(Continued)

Primary Examiner — Wiiliam B Partridge
(74) Attorney, Agent, or Firm — Rabin & Berdo, P.C.

(57) ABSTRACT

A method, computer program product and computer system for scaling and managing requests on a massively parallel machine, such as one running in MIMD mode on a SIMD machine. A submit mux (multiplexer) is used to federate work requests and to forward the requests to the management node. A resource arbiter receives and manges these work requests. A MIMD job controller works with the resource arbiter to manage the work requests on the SIMD partition. The SIMD partition may utilize a mux of its own to federate the work requests and the computer nodes. Instructions are also provided to control and monitor the work requests.

21 Claims, 5 Drawing Sheets

(56) References Cited

U.S. PATENT DOCUMENTS

| | | |
|---|---|---|
| 2008/0052322 A1 | 2/2008 | Gusciora |
| 2008/0177867 A1 | 7/2008 | Giampapa et al. |
| 2008/0201468 A1* | 8/2008 | Titus .......................... 709/224 |
| 2008/0288746 A1* | 11/2008 | Inglett et al. .................... 712/20 |
| 2008/0298273 A1* | 12/2008 | Armbruster et al. .......... 370/254 |
| 2009/0024830 A1 | 1/2009 | Budnik et al. |
| 2009/0300625 A1 | 12/2009 | Branson et al. |

\* cited by examiner

FIG. 5

SCALING AND MANAGING WORK REQUESTS ON A MASSIVELY PARALLEL MACHINE

CROSS REFERENCE TO RELATED APPLICATIONS

This present application is related to co-pending U.S. patent applications entitled—"Resource Management on a Computer System Utilizing Hardware and Environmental Factors" and "Configurable Persistent Storage on a Computer System Using a Database", filed concurrently herewith, and assigned Ser. Nos. 12/121,096 and 12/121,172, respectively.

BACKGROUND

This invention relates to parallel computing. More specifically, it relates to scaling and managing requests on a massively parallel machine.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination. Parallel computing may be implemented in architectures optimized to execute in a mode of 'Single Instruction, Multiple Data' ('SIMD') or in a mode of 'Multiple Instruction, Multiple Data' ('MIMD').

A MIMD machine is a computer in which multiple autonomous processors simultaneously execute different instructions on different data. Distributed systems are generally recognized to be MIMD architectures—either exploiting a single shared memory space or a distributed memory space. Many common computer applications are implemented with MIMD architectures, including, for example, most accounting programs, word processors, spreadsheets, database managers, browsers, web applications, other data communications programs, and so on.

A SIMD machine is a computer that exploits multiple data streams against a single instruction stream to perform operations which may be naturally parallelized. SIMD machines are ubiquitous on a small scale, in digital speech processors, graphics processors, and the like. SIMD machines execute parallel algorithms, typically including collective operations. A parallel algorithm can be split up to be executed a piece at a time on many different processing devices, and then put back together again at the end to get a data processing result. Some algorithms are easy to divide up into pieces. For example, the job of checking all of the numbers from one to a hundred thousand to see which are primes could be done, by assigning a subset of the numbers to each available processor, and then putting the list of positive results back together. In this specification, the multiple processing devices that execute the individual pieces of a parallel program are referred to as 'compute nodes.' A SIMD machine is composed of compute nodes and other processing nodes as well, including, for example, input/output (I/O) nodes, and service nodes.

Parallel algorithms are designed also to optimize the data communications requirements among the nodes of a SIMD machine. There are two ways parallel processors communicate: shared memory or message passing. Shared memory processing needs additional locking technology for the data and imposes the overhead of additional processor and bus cycles and also serializes some portions of the algorithm. Message passing uses high-speed data communications networks and message buffers, but this communication adds transfer overhead on the data communications networks as well as additional memory need for message buffers and latency in the data communications among nodes. Designs of SIMD machines use specially designed data communications links so that the communication overhead will be small, but it is the parallel algorithm that decides the volume of the traffic. It is possible to partition the machine into sets of compute nodes such that neighboring partitions are electrically isolated from each other. This allows multiple message passing interface (MPI) type jobs to execute concurrently.

BRIEF SUMMARY

A method, computer program product and computer system for scaling and managing requests on a massively parallel machine, such as one running in MIMD mode on a SIMD machine. A submit mux (multiplexer) is used to federate work requests and to forward the requests to the management node. A resource arbiter receives and manges these work requests. A MIMD job controller works with the resource arbiter to manage the work requests on the SIMD partition. The SIMD partition may utilize a mux of its own to federate the work requests and the computer nodes. Instructions are also provided to control and monitor the work requests.

DETAILED DESCRIPTION

The invention will now be described in more detail by way of example with reference to the embodiments shown in the accompanying Figures. It should be kept in mind that the following described embodiments are only presented by way of example and should not be construed as limiting the inventive concept to any particular physical configuration. Further, if used and unless otherwise stated, the terms "upper," "lower," "front," "back," "over," "under," and similar such terms are not to be construed as limiting the invention to a particular orientation. Instead, these terms are used only on a relative basis.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as JAVA™, SMALLTALK™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the a flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
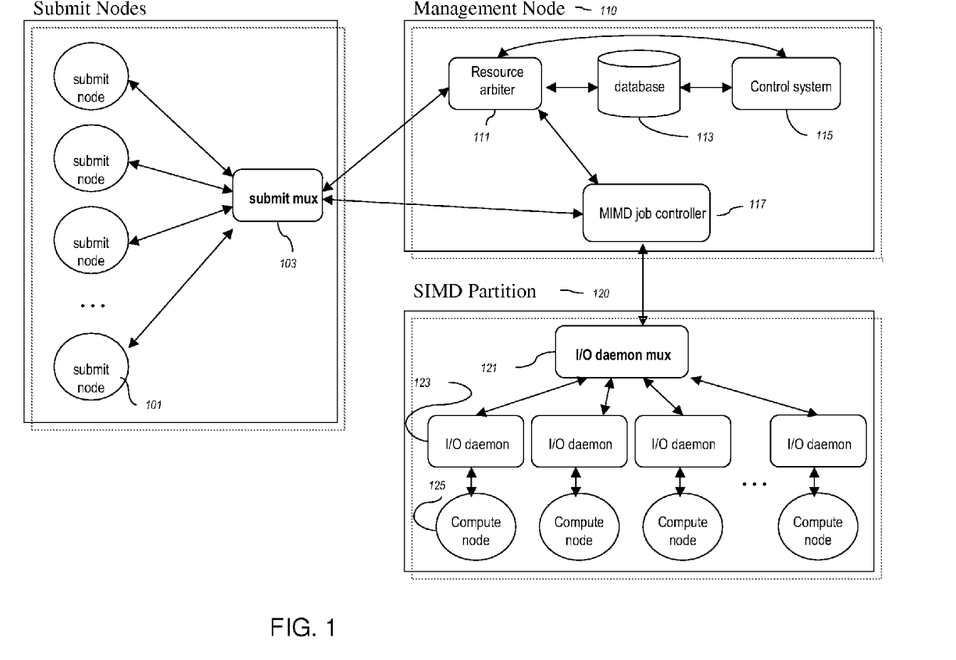
FIG. 1 is a diagram describing the interaction between submit nodes, a management node and the SIMD partition.

Turning now to FIG. 1, an embodiment of the invention is illustrated. The Figure describes a push-model to execute the MIMD programming model where the work requests are pushed from a submit node (101) to the management node (110). A push-model is contrasted with a pull-model in that control and knowledge of the request states vary with the resources. In a pull-model, the request states are indeterminate and only upon completion of the requests is information known by the submitter. In contrast, a push-model allows for the submitter to have knowledge of the states and consequently the ability to control the requests. The management node becomes aware of individual work requests which provides the ability to track and manage each request by storing them in a database (113). The management node interfaces with the SIMD partition (120) to perform the parallel processing.

The submit requests arrive in the form of a submit command executed from a submit node (101). The submit command acts as a shadow of the actual work request running on the compute node. The submit command connects to a submit mux (103) also running on the submit node. The submit mux acts as a multiplexer to federate, or multiplex, submit requests and forward them to the resource arbiter (111). During this process, a submit node (101) connects to the submit mux (103) and sends a version message to the submit mux (103). The submit mux (103) receives the message and validates its version information. If the submit node (101) uses an older or newer protocol, the submit mux (103) will reject the node. Otherwise, it will respond with a confirmation message. After receiving the confirmation, the submit node (101) sends another job message describing the work request with information such as an executable, an username, arguments, environment variables, a job mode, and an optional resource request. After receiving this job message, the submit mux (103) will perform validation to ensure the job message is well formed (e.g. the executable or username is not missing), and then forward this message to the resource arbiter (111) on the management node (110). Please note that the steps after the submit mux (103) receives the job message are a point of contention, since there is only one connection to the resource arbiter (111) from each submit mux (103), where an exclusive access to this connection is achieved by using a mutex. All other steps can happen in parallel, since there is a many-to-one relationship between the submit nodes (101) and the submit mux (103).

The resource arbiter (111), also known as the submit daemon, runs on the Management Node (110). The resource arbiter (111) performs resource allocation and arbitration, and forwards requests to the MIMD job controller (117). After receiving the job message from the submit mux (103), the resource arbiter (111) attempts to assign the work request to an available resource. If no resource is available, the resource arbiter (111) sends a response message to the submit mux (103). The response message is then forwarded to the submit node (101), which then disconnects from the submit mux (103). If an available resource is found, the resource arbiter (111) routes it to the appropriate MIMD job controller (117). The MIMD job controller (117) then speaks a similar protocol to the submit mux (103) to handle job input, output, and termination. A control system (115) interacts with the resource arbiter (111) as well as the database (113). Work request states updates are sent from the job controller (117) back to the resource arbiter (111), then inserted or updated into the database (113) for archiving.

Each work request has an individual submit command, allowing standard output, standard error, and standard input. When a submit command executes, the user ID responsible for the request is forwarded through the management node to a compute node (125), via the MIMD job controller (117), which interfaces with the I/O daemon mux (121), which acts as the resource arbiter for the SIMD partition (120). The I/O daemon mux forwards on the work request to the appropriate I/O daemon (123), which then allows the work to be done on the associated compute node (125).

Figure 2:
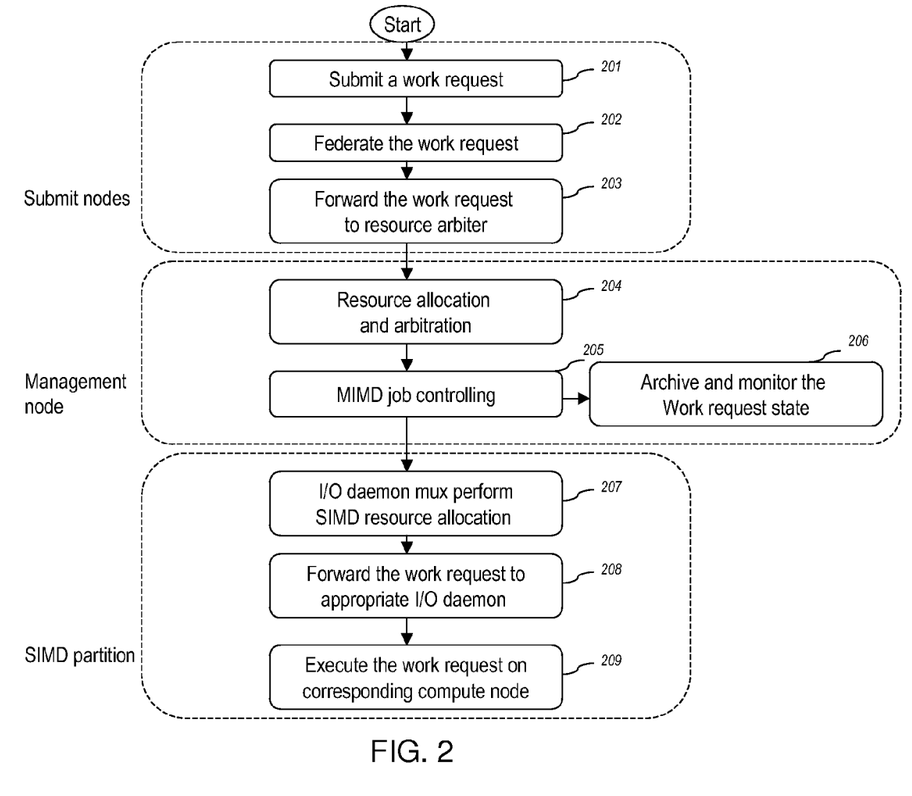
FIG. 2 is a flowchart illustrating the process of scaling and managing the MIMD programs on a SIMD machine.

FIG. 2 is a flowchart illustrating the process of scaling and managing the MIMD programs on a SIMD machine in one embodiment of the present invention. A work request is submitted from one of the submit nodes 101 in state 201. The submit mux 103 federates the work request (state 202) and then sends the work request to the resource arbiter 111 (state 203). The resource arbiter will perform resource allocation and arbitration (state 204) and send the work request to the MIMD job controller 117, which will send the work request to the I/O daemon mux 121 and send the state updates of the work request back to the resource arbiter 111. The resource arbiter will archive and monitor the work request states in state 206 with the control system 115 using the database 113. The I/O daemon mux 121 will then perform SIMD resource allocation in state 207, and forward the work request to the appropriate I/O daemon 123 (state 208). Finally in state 209, the work request executes on the corresponding compute node 125. Among all the steps, states 201-203 are performed on the submit nodes of the system, states 204-206 are performed on the management node, and states 207-209 are performed on the SIMD partition of the system.

This resulting work-request model improves the scaling capability and also allows various benefits. It is a push-model in the sense that the program state of the work requests running on the compute nodes is now available to the system since the requests flow from the submit node out to the compute nodes and may still be controlled because they are readily identifiable. Instructions may be provided to manage and control the work requests. The information that is available includes the executable name, arguments, user ID, working directory, start time and the exit status; all information that is useful for effective administration and management of the massively parallel machine. The ability to kill or signal an individual work request would be available. From a scheduling and allocation perspective each work request receives a granularity of detail, allowing it to be distinguished from one another in the SIMD partition. Scalability and security concerns may also be implemented in this model. For example, the scalability can be implemented by allowing multiple instances of the submit mux, and the security model is scalable since the authentication is done once per submit mux rather than once per submit client.

In one embodiment, the submit mux may be implemented as software, allowing for a dynamic configuration. One skilled in the art will be able to recognize or contemplate variations on the implementation of the submit mux, which is a multiplexer.

In another embodiment of the invention, the submit mux may be designed to automatically reject certain submit requests, thereby preventing the work request from reaching the management node, and removing that overhead.

Figure 3:
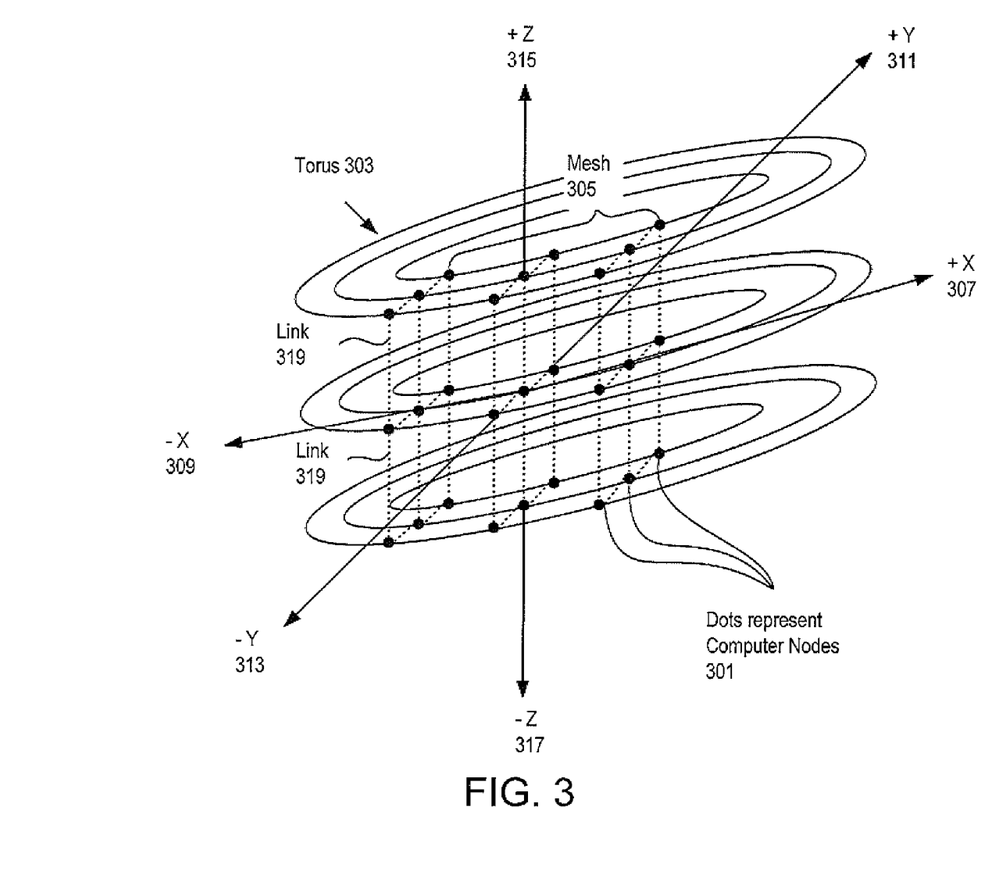
FIG. 3 is an exemplary diagram describing a configuration of compute nodes on the SIMD partition.

For further explanation, FIG. 3 illustrates an exemplary data communications network optimized for point to point operations. In FIG. 3, dots represent compute nodes (301) of a SIMD machine, and the dotted lines between the dots represent data communications links (319) between compute nodes. The data communications links are implemented with point to point data communications adapters, with data communications links on three axes, x, y, and z, and to and fro in six directions +x (307), −x (309), +y (311), −y (313), +z (315), and −z (317). The links and compute nodes are organized by this data communications network optimized for point to point operations into a three dimensional mesh (305) that wraps around to form a torus (303). Each compute node in the torus has a location in the torus that is uniquely specified by a set of x, y, z coordinates. For clarity of explanation, FIG. 3 is illustrated with only 27 compute nodes, but readers will recognize that a data communications network optimized for point to point operations for use in executing MIMD programs on a SIMD machine in accordance with embodiments of the present invention may contain only a few compute nodes or may contain thousands of compute nodes.

Figure 4:
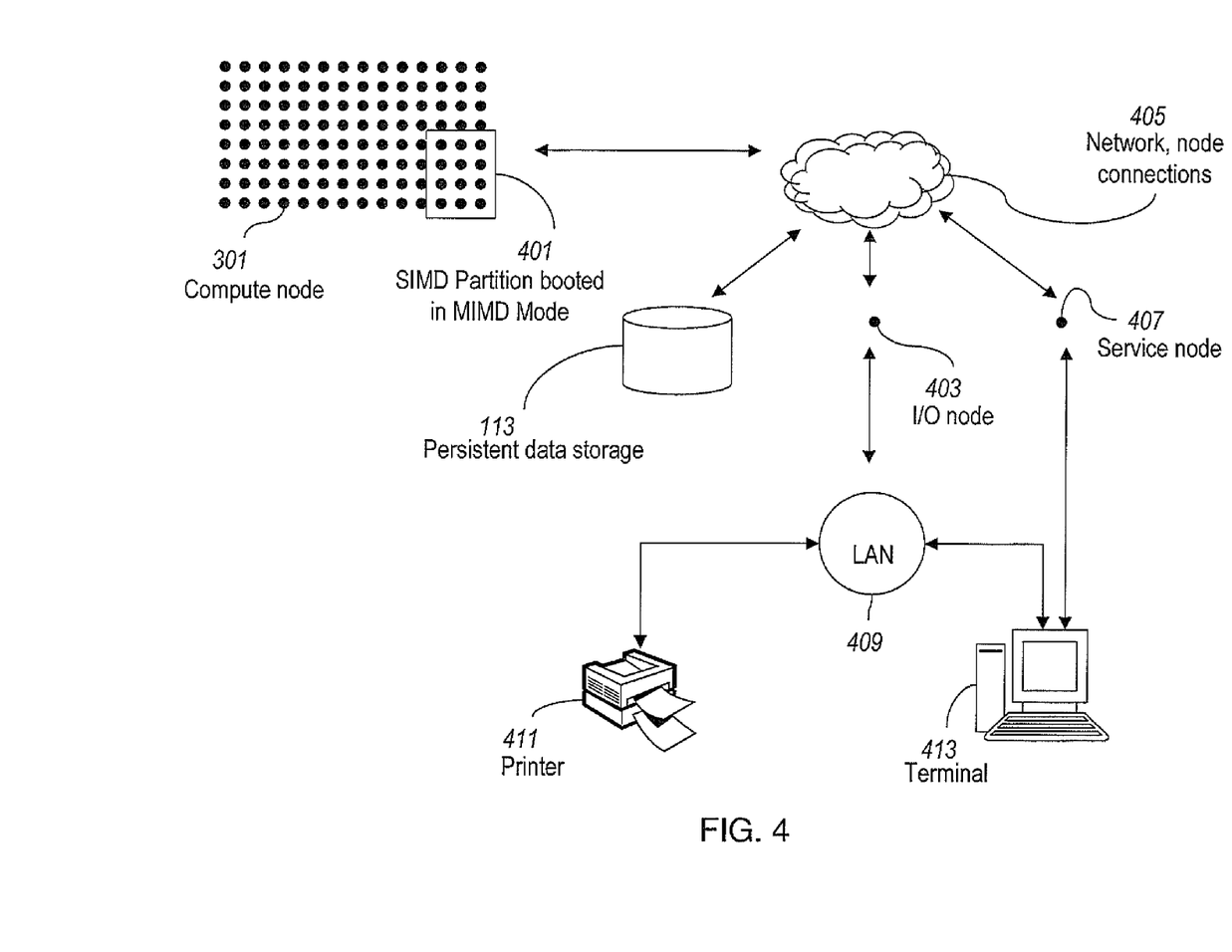
FIG. 4 is an exemplary diagram describing the relationship of the various components relevant to the massively parallel machine.

Also for clarity, FIG. 4 is a diagram describing the relationship of the various components relevant to the massively parallel machine. The compute nodes (301) discussed in FIG. 3 may be partitioned off to be isolated from other compute nodes. This SIMD partition (120), which was also illustrated in FIG. 1, may function in MIMD mode, allowing for the MIMD paradigm to function on the SIMD machine. This partition communicates with other nodes and devices via network and node connections, such as Ethernet (405). One skilled in the art will be able to contemplate various means for this communication. The other devices that may be communicated with include a persistent data storage device (113), I/O nodes (403) and a service node (407). The I/O node is a point that can interact with a local area network (LAN) (409). A terminal (413) or an output device such as a printer (411) may be connected to the LAN. The terminal may also be connected directly with a service node.

Figure 5:
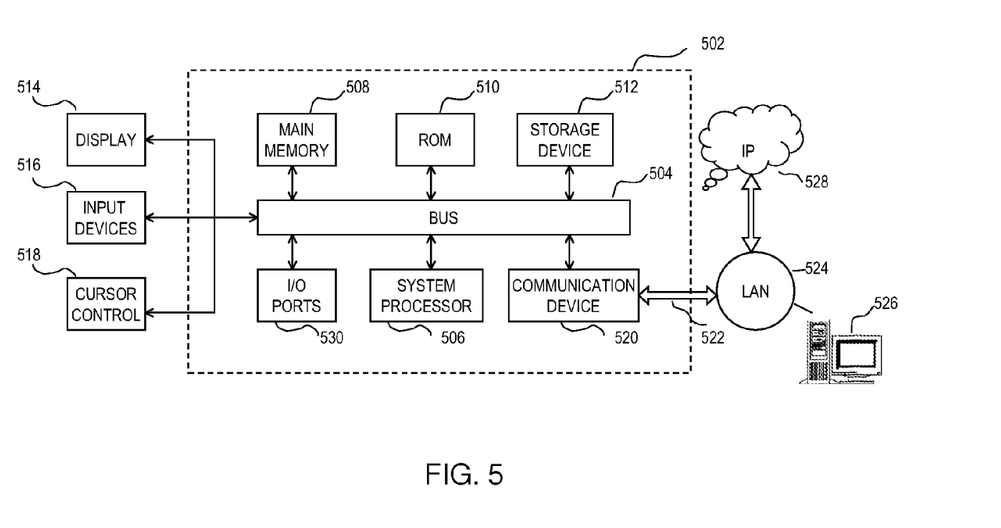
FIG. 5 is a conceptual diagram of a computer system.

FIG. 5 illustrates a computer system (502) upon which the present invention may be implemented. The computer system may be any one of a personal computer system, a work station computer system, a lap top computer system, an embedded controller system, a microprocessor-based system, a digital signal processor-based system, a hand held device system, a personal digital assistant (PDA) system, a wireless system, a wireless networking system, etc. The computer system includes a bus (504) or other communication mechanism for communicating information and a processor (506) coupled with bus (504) for processing the information. The computer system also includes a main memory, such as a random access memory (RAM) or other dynamic storage device (e.g., dynamic RAM (DRAM), static RAM (SRAM), synchronous DRAM (SDRAM), flash RAM), coupled to bus for storing information and instructions to be executed by processor (506). In addition, main memory (508) may be used for storing temporary variables or other intermediate information during execution of instructions to be executed by processor. The computer system further includes a read only memory (ROM) 510 or other static storage device (e.g., programmable ROM (PROM), erasable PROM (EPROM), and electrically erasable PROM (EEPROM)) coupled to bus 504 for storing static information and instructions for processor. A storage device (512), such as a magnetic disk or optical disk, is provided and coupled to bus for storing information and instructions. This storage device is an example of a computer readable medium, upon which the program may be encoded.

The computer system also includes input/output ports (530) to input signals to couple the computer system. Such coupling may include direct electrical connections, wireless connections, networked connections, etc., for implementing automatic control functions, remote control functions, etc. Suitable interface cards may be installed to provide the necessary functions and signal levels.

The computer system may also include special purpose logic devices (e.g., application specific integrated circuits (ASICs)) or configurable logic devices (e.g., generic array of logic (GAL) or re-programmable field programmable gate arrays (FPGAs)), which may be employed to replace the functions of any part or all of the method as described with reference to FIG. 1 and FIG. 2. Other removable media devices (e.g., a compact disc, a tape, and a removable magneto-optical media) or fixed, high-density media drives, may be added to the computer system using an appropriate device bus (e.g., a small computer system interface (SCSI) bus, an enhanced integrated device electronics (IDE) bus, or an ultra-direct memory access (DMA) bus). The computer system may additionally include a compact disc reader, a compact disc reader-writer unit, or a compact disc jukebox, each of which may be connected to the same device bus or another device bus.

The computer system may be coupled via bus to a display (514), such as a cathode ray tube (CRT), liquid crystal display (LCD), voice synthesis hardware and/or software, etc., for displaying and/or providing information to a computer user. The display may be controlled by a display or graphics card. The computer system includes input devices, such as a keyboard (516) and a cursor control (518), for communicating information and command selections to processor (506). Such command selections can be implemented via voice recognition hardware and/or software functioning as the input devices (516). The cursor control (518), for example, is a mouse, a trackball, cursor direction keys, touch screen display, optical character recognition hardware and/or software, etc., for communicating direction information and command selections to processor (506) and for controlling cursor movement on the display (514). In addition, a printer (not shown in FIG. 5) may provide printed listings of the data structures, information, etc., or any other data stored and/or generated by the computer system.

The computer system performs a portion or all of the processing steps of the invention in response to processor executing one or more sequences of one or more instructions contained in a memory, such as the main memory. Such instructions may be read into the main memory from another computer readable medium, such as storage device. One or more processors in a multi-processing arrangement may also be employed to execute the sequences of instructions contained in main memory. In alternative embodiments, hard-wired circuitry may be used in place of or in combination with software instructions. Thus, embodiments are not limited to any specific combination of hardware circuitry and software.

The computer code devices of the present invention may be any interpreted or executable code mechanism, including but not limited to scripts, interpreters, dynamic link libraries, JAVA™ classes, and complete executable programs. Moreover, parts of the processing of the present invention may be distributed for better performance, reliability, and/or cost.

The computer system also includes a communication interface coupled to bus. The communication interface (520) provides a two-way data communication coupling to a network link (522) that may be connected to, for example, a local network (524). For example, the communication interface (520) may be a network interface card to attach to any packet switched local area network (LAN). As another example, the communication interface (520) may be an asymmetrical digital subscriber line (ADSL) card, an integrated services digital network (ISDN) card or a modem to provide a data communication connection to a corresponding type of telephone line. Wireless links may also be implemented via the communication interface (520). In any such implementation, the communication interface (520) sends and receives electrical, electromagnetic or optical signals that carry digital data streams representing various types of information.

Network link (522) typically provides data communication through one or more networks to other data devices. For example, the network link may provide a connection to a computer (526) through local network (524) (e.g., a LAN) or through equipment operated by a service provider, which provides communication services through a communications network (528). In preferred embodiments, the local network and the communications network preferably use electrical, electromagnetic, or optical signals that carry digital data streams. The signals through the various networks and the signals on the network link and through the communication interface, which carry the digital data to and from the computer system, are exemplary forms of carrier waves transporting the information. The computer system can transmit notifications and receive data, including program code, through the network(s), the network link and the communication interface.

It should be understood, that the invention is not necessarily limited to the specific process, arrangement, materials and components shown and described above, but may be susceptible to numerous variations within the scope of the invention. Additionally, a person skilled in the art will readily be able to implement the source code and means of performing this optimization.

What is claimed is:

1. A method for scaling and managing a plurality of work requests on a parallel machine having a plurality of compute nodes, comprising:
pushing the plurality of work requests to a submit multiplexer;
multiplexing, by the submit multiplexer, the plurality of work requests based on mutex (mutual exclusion), and forwarding the multiplexed plurality of work requests via a single connection to a resource arbiter;
receiving, by the resource arbiter, the multiplexed plurality of work requests via the single connection from the submit multiplexer, and routing the received multiplexed plurality of work requests to a MIMD (Multiple Instructions Multiple Data) job controller;

sending, by the MIMD job controller, the work requests routed thereto to an I/O (input/output) daemon multiplexer;

tracking and managing, by the resource arbiter, each of the work requests routed to the MIMD job controller;

performing, by the I/O daemon multiplexer, SIMD (Single Instruction Multiple Data) resource allocation on the work requests sent thereto from the MIMD job controller, to thereby assign each of the work requests sent thereto to one of a plurality of computer nodes; and executing each of the work requests sent to the I/O daemon multiplexer on the corresponding compute node assigned to the work request.

2. The method of claim 1, wherein the parallel machine includes a SIMD partition working in a MIMD mode.

3. The method of claim 1, wherein the tracking and managing include tracking and managing the work requests routed to the MIMD job controller using a control system and a database that interact with the resource arbiter and the MIMD job controller.

4. The method of claim 1, wherein each of the plurality of work requests is pushed to the submit multiplexer in a form of a submit command, the submit command allowing a standard input, a standard output and a standard error.

5. The method of claim 1, wherein multiplexing the plurality of work requests includes the submit multiplexer, for each of the plurality of work requests,
   receiving a version message;
   receiving a job message describing the work request;
   validating the received job message; and
   forwarding the validated job message to the resource arbiter, wherein
   the submit multiplexer forwards validated jobs to the resource arbiter one at a time.

6. The method of claim 1, wherein the routing includes:
   determining, by the resource arbiter for each of the received multiplexed plurality of work requests, whether resources are allocable thereto;
   routing each received multiplexed work request that is determined to be resources-allocable to the MIMD job controller, and
   sending a response message from the resource arbiter via the submit multiplexer to a node that makes a received multiplexed work request that is determined to be not resources-allocable, to thereby disconnect the node from the submit multiplexer.

7. The method of claim 1, further comprising
   sending, by the MIMD job controller, work request state updates to the resource arbiter, and
   tracking and managing, by the resource arbiter, the work request state updates.

8. A computer program product for scaling and managing a plurality of work requests on a parallel machine having a plurality of compute nodes, comprising:
   a non-transitory computer usable medium having computer usable program code embodied therewith, the computer usable program code comprising:
      instructions to push the plurality of work requests to a submit multiplexer;
      instructions to use the submit multiplexer to multiplex the plurality of work requests based on mutex (mutual exclusion), and to forward the multiplexed plurality of work requests via a single connection to a resource arbiter;
      instructions to provide a resource arbiter to receive the multiplexed plurality of work requests, and to route the received multiplexed plurality of work requests to a MIMD (Multiple Instructions Multiple Data) job controller;
      instructions to send, by the MIMD job controller, the work requests routed thereto to an I/O (input/output) daemon multiplexer;
      instructions to track and manage, by the resource arbiter, each of the work requests routed to the MIMD job controller;
      instructions to perform, by the I/O daemon multiplexer, SIMD (Single Instruction Multiple Data) resource allocation on the work requests sent thereto from the MIMD job controller, to thereby assign each of the work requests sent thereto to one of a plurality of computer nodes; and
      instructions to execute each of the work requests sent to the I/O daemon multiplexer on the corresponding compute node assigned to the work request.

9. The computer program product of claim 8, wherein the parallel machine includes a SIMD partition working in a MIMD mode.

10. The computer program product of claim 8, wherein the instructions to track and manage include instructions to track and manage the work requests routed to the MIMD job controller using a control system and a database that interact with the resource arbiter and the MIMD job controller.

11. The computer program product of claim 8, wherein each of the plurality of work requests is pushed to the submit multiplexer in a form of a submit command, the submit command allowing a standard input, a standard output and a standard error.

12. The computer program product of claim 8, wherein the instructions to multiplex the plurality of work requests include instructions for the submit multiplexer, for each of the plurality of work requests,
   to receive a version message,
   to receive a job message describing the work request,
   to validate the received job message, and
   to forward the validated job message to the resource arbiter, wherein
   the submit multiplexer forwards validated jobs to the resource arbiter one at a time.

13. The computer program product of claim 8, wherein the instructions to route include:
   instructions to determine, by the resource arbiter for each of the received multiplexed plurality work requests, whether resources are allocable thereto;
   instructions to route each received multiplexed work request that is determined to be resources-allocable to the MIMD job controller, and
   instructions to send a response message from the resource arbiter via the submit multiplexer to a node that makes a received multiplexed work request determined to be not resources-allocable, to thereby disconnect the node from the submit multiplexer.

14. The computer program product of claim 8, further comprising
   instructions to send, by the MIMD job controller, work request state updates to the resource arbiter, and
   instructions to track and manage, by the resource arbiter, the work request state updates.

15. A computer system comprising:
a processor;
a memory operatively coupled to the processor;
a storage device operatively coupled to the processor and memory; and
a computer program product for scaling and managing a plurality of work requests on a parallel machine having a plurality of compute nodes, comprising:
instructions to push the plurality of work requests to a submit multiplexer;
instructions to use the submit multiplexer to multiplex the plurality of work requests based on mutex (mutual exclusion), and to forward the multiplexed plurality of work requests via a single connection to a resource arbiter;
instructions to provide a resource arbiter to receive the multiplexed plurality of work requests, and to route the received multiplexed plurality of work requests to a MIMD (Multiple Instructions Multiple Data) job controller;
instructions to send, by the MIMD job controller, the work requests routed thereto to an I/O (input/output) daemon multiplexer;
instructions to track and manage, by the resource arbiter, each of the work requests routed to the MIMD job controller;
instructions to perform, by the I/O daemon multiplexer, SIMD (Single Instruction Multiple Data) resource allocation on the work requests sent thereto from the MIMD job controller, to thereby assign each of the work requests sent thereto to one of a plurality of compute nodes; and
instructions to execute each of the work requests sent to the I/O daemon multiplexer on the corresponding compute node assigned to the work request.

16. The computer system of claim 15, wherein the parallel machine includes a SIMD partition working in a MIMD mode.

17. The computer system of claim 15, wherein the instructions to track and manage include instructions to track and manage the work requests routed to the MIMD job controller using a control system and a database that interact with the resource arbiter and the MIMD job controller.

18. The computer system of claim 15, wherein each of the plurality of work requests is pushed to the submit multiplexer in a form of a submit command, the submit command allowing a standard input, a standard output and a standard error.

19. The computer system of claim 15, wherein the instructions to multiplex the plurality of work requests include instructions for the submit multiplexer, for each of the plurality of work requests,
to receive a version message,
to receive a job message describing the work request,
to validate the received job message, and
to forward the validated job message to the resource arbiter, wherein
the submit multiplexer forwards validated jobs to the resource arbiter one at a time.

20. The computer system of claim 15, wherein the instructions to route include:
instructions to determine, by the resource arbiter for each of the received multiplexed plurality work requests, whether resources are allocable thereto;
instructions to route each received multiplexed work request that is determined to be resources-allocable to the MIMD job controller, and
instructions to send a response message from the resource arbiter via the submit multiplexer to a node that makes a received multiplexed work request determined to be not resources-allocable, to thereby disconnect the node from the submit multiplexer.

21. The computer system of claim 15, further comprising instructions to send, by the MIMD job controller, work request state updates to the resource arbiter, and
instructions to track and manage, by the resource arbiter, the work request state updates.

* * * * *